United States Patent
Kyowski et al.

(10) Patent No.: US 9,852,280 B2
(45) Date of Patent: Dec. 26, 2017

(54) AUTHENTICATION FOR ACCESS TO A DEVICE THAT HAS A PRIMARY DISPLAY PORTION AND A SECONDARY DISPLAY PORTION

(71) Applicant: BlackBerry Limited, Waterloo (CA)

(72) Inventors: Timothy Herbert Kyowski, Waterloo (CA); Marc Elis Meunier, Kitchener (CA); Jason Tyler Griffin, Kitchener (CA)

(73) Assignee: BlackBerry Limited, Waterloo, Ontario ( * ) Notice: Subject to any disclaimer, the term of this patent is extended or adjusted under 35 U.S.C. 154(b) by 3 days.

(21) Appl. No.: 14/592,468

(22) Filed: Jan. 8, 2015

(65) Prior Publication Data
US 2016/0203307 A1   Jul. 14, 2016

(51) Int. Cl.
G06F 21/36 (2013.01)
G06F 21/31 (2013.01)

(52) U.S. Cl.
CPC .............. G06F 21/36 (2013.01); G06F 21/31 (2013.01)

(58) Field of Classification Search
CPC ................................. G06F 21/31; G06F 21/36
See application file for complete search history.

(56) References Cited

U.S. PATENT DOCUMENTS

| | | | | |
|---|---|---|---|---|
| 2004/0010721 A1* | 1/2004 | Kirovski | .................. | G06F 21/36 713/183 |
| 2004/0219902 A1* | 11/2004 | Lee | ......................... | G06F 21/36 455/410 |
| 2005/0044395 A1* | 2/2005 | Staring | .................... | G09C 5/00 726/26 |
| 2005/0117748 A1* | 6/2005 | Schrijen | .................. | G06F 21/83 380/200 |
| 2006/0008086 A1* | 1/2006 | Kevenaar | ................. | G09C 5/00 380/43 |
| 2008/0244700 A1* | 10/2008 | Osborn | .................... | G06F 21/36 726/2 |
| 2011/0197259 A1* | 8/2011 | Thibadeau | .............. | G06F 21/36 726/2 |
| 2012/0159582 A1* | 6/2012 | Griffin | .................... | G06F 21/36 726/5 |
| 2012/0159583 A1* | 6/2012 | Griffin | .................... | G06F 21/36 726/5 |

(Continued)

OTHER PUBLICATIONS

Thibadeau, Sr. et al., "Method and System of Providing a Picture Password for Relatively Smaller Displays," U.S. Appl. No. 61/982,375, filed Apr. 22, 2014.*

(Continued)

Primary Examiner — Kari Schmidt
(74) Attorney, Agent, or Firm — Ridout & Maybee LLP (57) ABSTRACT

An authentication scheme in which an instance of a designated element is shifted to proximity with a designated target to gain access a device may be enhanced by creating conditions that allow for either the designated element or the designated target to be different for each instance of authentication. In one embodiment, a secondary display portion may be used to provide an indication of a dynamic designated element. In another embodiment, a secondary display portion, in combination with a tertiary display portion, may be used to provide an indication of a dynamic designated target.

15 Claims, 9 Drawing Sheets

(56) References Cited

U.S. PATENT DOCUMENTS

| | | | | |
|---|---|---|---|---|
| 2012/0159593 A1* | 6/2012 | Griffin | ................... | G06F 21/36 726/7 |
| 2012/0159616 A1* | 6/2012 | Griffin | ................... | G06F 21/36 726/19 |
| 2012/0166998 A1* | 6/2012 | Cotterill | ................ | G06F 3/0483 715/780 |
| 2012/0167199 A1* | 6/2012 | Riddiford | ........... | G06F 3/04842 726/16 |
| 2012/0272311 A1* | 10/2012 | Althammer | ............ | G06F 21/36 726/16 |
| 2013/0212674 A1* | 8/2013 | Boger | ................. | G09B 21/008 726/17 |
| 2013/0263218 A1* | 10/2013 | Awaraji | ............... | G06F 19/322 726/3 |
| 2013/0265257 A1* | 10/2013 | Jung | .................... | G06F 3/0412 345/173 |
| 2014/0181956 A1* | 6/2014 | Ahn | ....................... | G06F 21/46 726/18 |
| 2014/0267990 A1* | 9/2014 | Moon | ................... | G06F 1/1605 349/122 |
| 2014/0325678 A1* | 10/2014 | Kotla | ..................... | G06F 21/62 726/28 |
| 2014/0359650 A1* | 12/2014 | Ohtake | ............ | H04N 21/42208 725/25 |
| 2014/0373132 A1* | 12/2014 | Basmov | ................. | G06F 21/36 726/19 |
| 2015/0261376 A1* | 9/2015 | Kim | ...................... | G06F 3/0487 345/173 |
| 2015/0304303 A1* | 10/2015 | Thibadeau, Sr. | ..... | H04L 63/083 726/5 |

OTHER PUBLICATIONS

Halpert, Benjamin J. "Authentication interface evaluation and design for mobile devices." Proceedings of the 2nd annual conference on Information security curriculum development. ACM, 2005. pp. 112-117.*

Zorrilla, Mikel, et al. "User interface adaptation for multi-device Web-based media applications." Broadband Multimedia Systems and Broadcasting (BMSB), 2015 IEEE International Symposium on. IEEE, 2015. pp. 1-7.*

* cited by examiner

AUTHENTICATION FOR ACCESS TO A DEVICE THAT HAS A PRIMARY DISPLAY PORTION AND A SECONDARY DISPLAY PORTION

FIELD

The present application relates generally to authentication for access to a device and, more specifically, to authentication for access to a device that has a primary display portion and a secondary display portion.

BACKGROUND

As each generation of smartphone becomes more important to the day-to-day life of individual users, protection of the often-sensitive data contained on a smartphone become increasingly important. Such protection is typically provided by securing a smartphone with one or more forms of authentication. That is, a user must successfully complete an authentication process to be granted access to the smartphone.

BRIEF DESCRIPTION OF THE DRAWINGS

Reference will now be made, by way of example, to the accompanying drawings which show example implementations; and in which.

DETAILED DESCRIPTION

It is proposed, in the present application, to enhance an authentication scheme, which has been developed for a device with a single display screen, for use on a device with a primary display portion and at least a secondary display portion. Use of the secondary display portion, especially when the secondary display portion is on viewing plane that differs from the viewing plane of the primary display portion, may be considered to offer, to a user, enhanced security when the user employs the extended authentication mechanism to gain access the device. Alternatively, the authentication scheme may be enhanced for use on a device with a primary display portion, a secondary display portion and a tertiary display portion.

According to an aspect of the present disclosure, there is provided a method of authenticating access to an electronic device. The method includes displaying an image on a primary display portion, the image including a designated target; displaying a first plurality of elements on the primary display portion overlaying the image, the first plurality of elements including an instance of a designated element; and displaying a second plurality of elements on a secondary display portion. The method further includes detecting sufficient proximity between: the instance of the designated element; and the designated target; and responsive to the detecting, allowing access to the electronic device. In other aspects of the present application, an electronic device is provided with a processor adapted to carry out this method and a computer readable medium is provided for adapting a processor in a electronic device to carry out this method.

Other aspects and features of the present disclosure will become apparent to those of ordinary skill in the art upon review of the following description of specific implementations of the disclosure in conjunction with the accompanying figures.

Figure 1:
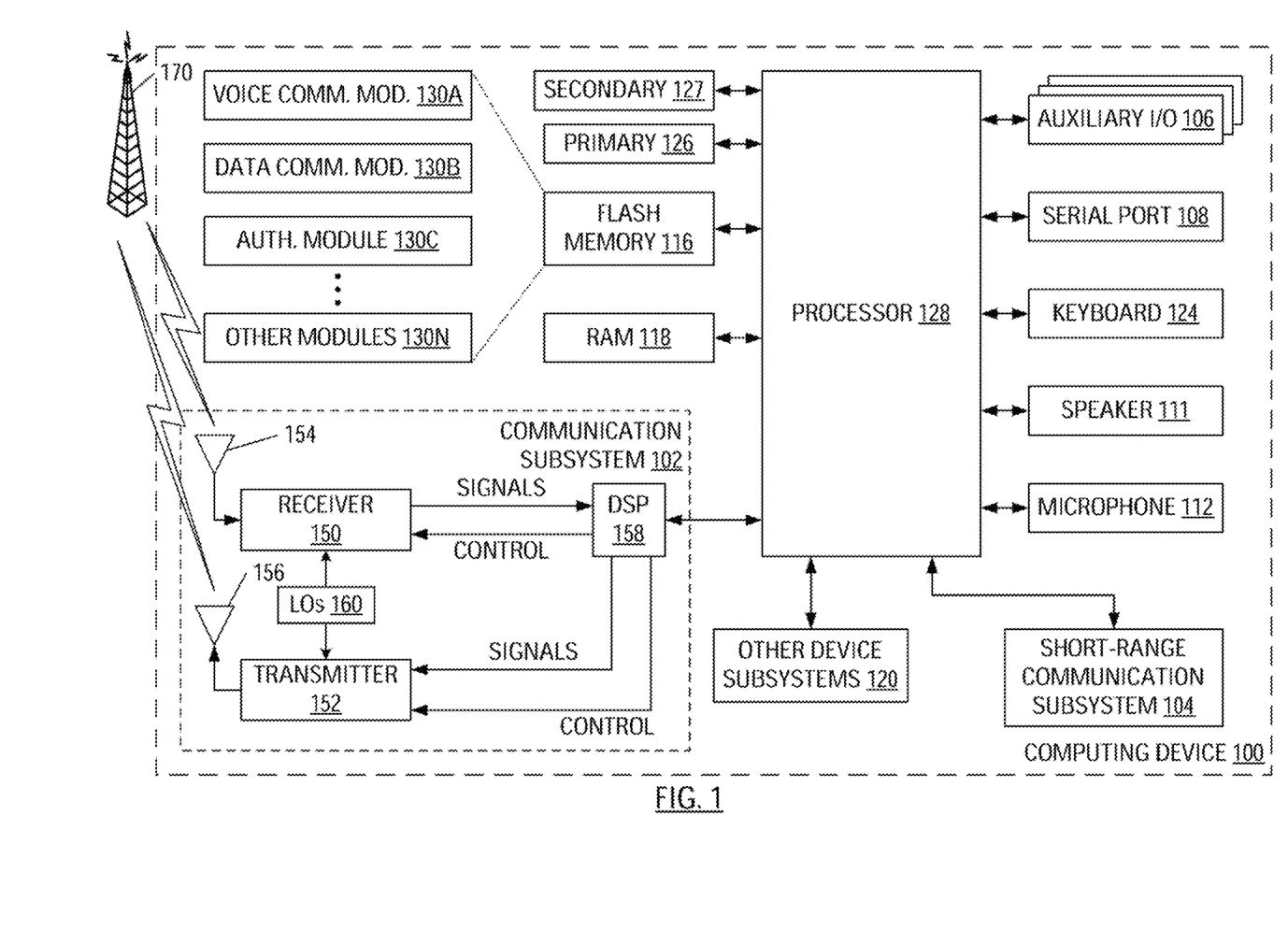
FIG. 1 illustrates a computing device as an example of a device that may carry out aspects of the present application.

FIG. 1 illustrates a computing device 100 as an example of a computing device that may carry out aspects of the present disclosure. The computing device 100 may comprise a housing, an input device (e.g., a keyboard 124 having a plurality of keys) and an output device. The output device may comprise two or more output devices. For example, the output device may be implemented as a primary display portion 126 and a secondary display portion 127. The display portions 126, 127 may comprise full graphic, or full color, Liquid Crystal Display (LCD). In some embodiments, the display portions 126, 127 may comprise touchscreen displays. In such embodiments, the keyboard 124 may comprise a virtual keyboard. Other types of output devices may alternatively be utilized. A processing device (a microprocessor 128) is shown schematically in FIG. 1 as coupled between the keyboard 124 and the display portions 126, 127. The microprocessor 128 controls the operation of the display portions 126, 127, as well as the overall operation of the computing device 100, in part, responsive to actuation of the keys on the keyboard 124 by a user.

The housing may be elongated vertically, or may take on other sizes and shapes (including clamshell housing structures). In the case in which the keyboard 124 includes keys that are associated with at least one alphabetic character and at least one numeric character, the keyboard 124 may include a mode selection key, or other hardware or software, for switching between alphabetic entry and numeric entry.

In addition to the microprocessor 128, other optional parts of the computing device 100 are shown schematically in FIG. 1. These may include a communications subsystem 102, a short-range communications subsystem 104, the keyboard 124 and the display portions 126, 127. The computing device 100 may further include other input/output devices, such as a set of auxiliary I/O devices 106, a serial port 108, a speaker 111 and a microphone 112. The computing device 100 may further include memory devices including a flash memory 116 and a Random Access Memory (RAM) 118 and various other device subsystems 120. The computing device 100 may comprise a two-way radio frequency (RF) communication device having voice and data communication capabilities. In addition, the computing device 100 may have the capability to communicate with other computer systems via the Internet.

Operating system software executed by the microprocessor 128 may be stored in a computer readable medium, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device may also be stored to the RAM 118.

The microprocessor 128, in addition to its operating system functions, enables execution of software applications on the computing device 100. A set of software applications that control basic device operations, such as a voice communications module 130A and a data communications module 130B, may be installed on the computing device 100 during manufacture. An authentication module 130C may also be installed on the computing device 100 during manufacture, to implement aspects of the present disclosure. As well, additional software modules, illustrated as other software modules 130N, which may comprise, for instance, a personal information manager (PIM) application, may be installed during manufacture. The PIM application may be capable of organizing and managing data items, such as e-mail messages, calendar events, voice mail messages, appointments and task items. The PIM application may also be capable of sending and receiving data items via a wireless carrier network 170 represented by a radio tower. The data items managed by the PIM application may be seamlessly integrated, synchronized and updated via the wireless carrier network 170 with the device user's corresponding data items stored or associated with a host computer system.

Communication functions, including data and optionally voice communications, are performed through the communication subsystem 102 and, possibly, through the short-range communications subsystem 104. The communication subsystem 102 includes a receiver 150, a transmitter 152 and one or more antennas, illustrated as a receive antenna 154 and a transmit antenna 156. In addition, the communication subsystem 102 also includes a processing module, such as a digital signal processor (DSP) 158, and local oscillators (LOs) 160. The specific design and implementation of the communication subsystem 102 is dependent upon the communication network in which the computing device 100 is intended to operate. For example, the communication subsystem 102 of the computing device 100 may be designed to operate with the General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), Long Term Evolution (LTE), etc. Other types of data and voice networks, both separate and integrated, may also be utilized with the computing device 100.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in GPRS networks, network access is associated with a subscriber or user of a device. A GPRS device therefore uses a subscriber identity module, commonly referred to as a Subscriber Identity Module (SIM), in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the computing device 100 may send and receive communication signals over the wireless carrier network 170. Signals received from the wireless carrier network 170 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the wireless carrier network 170 are processed (e.g., modulated and encoded) by the DSP 158 and are then provided to the transmitter 152 for digital to analog conversion, frequency up conversion, filtering, amplification and transmission to the wireless carrier network 170 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 102 and is input to the microprocessor 128. The received signal is then further processed by the microprocessor 128 for output to the display portions 126, 127, or alternatively to some auxiliary I/O devices 106. A device user may also compose data items, such as e-mail messages, using the keyboard 124 and/or some other auxiliary I/O device 106, such as a touchpad, a rocker switch, a thumb-wheel, a trackball, a touchscreen, or some other type of input device. The composed data items may then be transmitted over the wireless carrier network 170 via the communication subsystem 102.

In an optional voice communication mode, overall operation of the device is substantially similar to the data communication mode, except that received signals are output to the speaker 111, and signals for transmission are generated by a microphone 112. Alternative voice or audio I/O subsystems, such as a voice message recording subsystem, may also be implemented on the computing device 100. In addition, the display portions 126, 127 may also be utilized in voice communication mode, for example, to display the identity of a calling party, the duration of a voice call, or other voice call related information.

The short-range communications subsystem 104 enables communication between the computing device 100 and other proximate systems or devices, which need not necessarily be similar devices. For example, the short-range communications subsystem may include an infrared device and associated circuits and components, or a Bluetooth™ communication module to provide for communication with similarly-enabled systems and devices, or a near field communication (NFC) module, etc.

Figure 2:
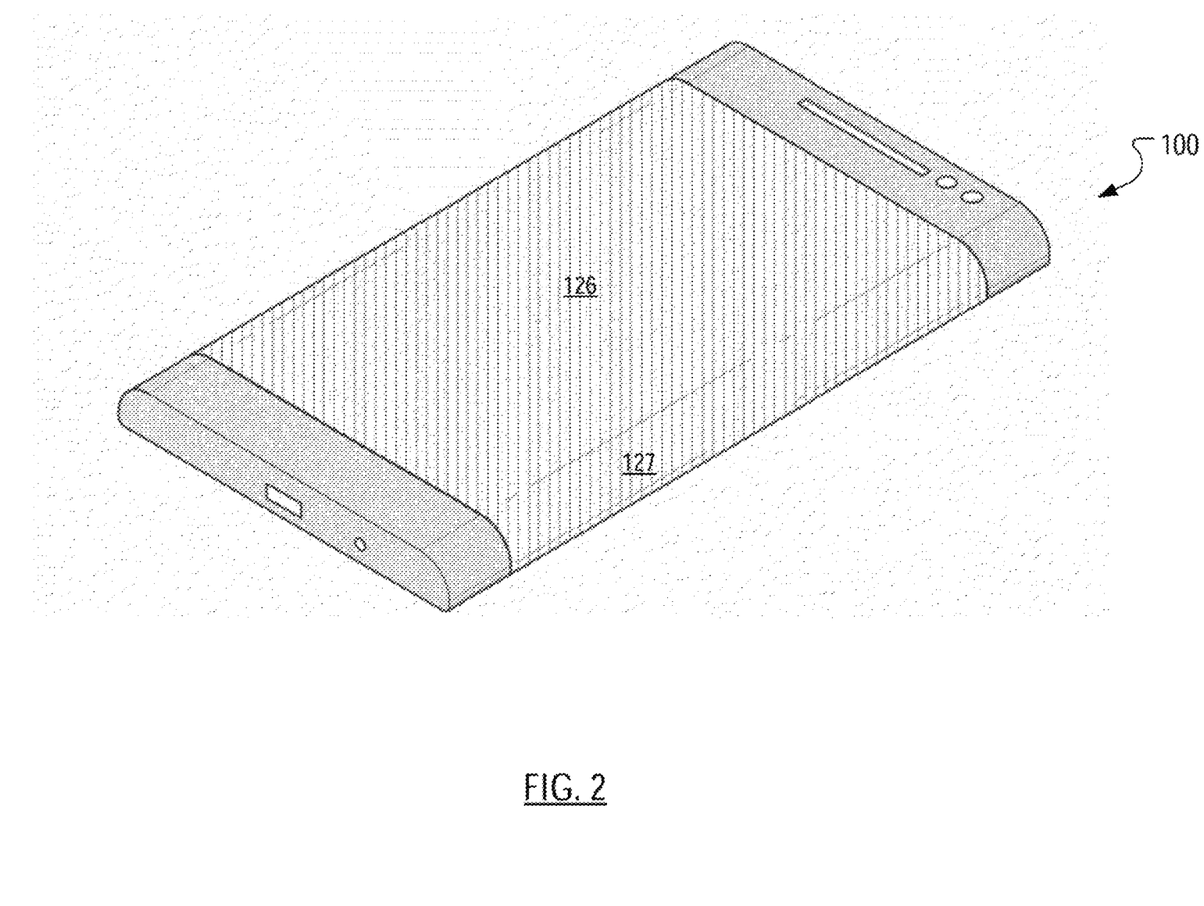
FIG. 2 illustrates, in perspective view, the mobile communication device of FIG. 1 with a primary display and a secondary display in accordance with an aspect of the present application.

FIG. 2 illustrates, in perspective view, the computing device 100 so that an example implementation of the primary display portion 126 and secondary display portion 127 may be considered.

In operation of aspects of the present application, the authentication module 130C may make a determination that the user has successfully aligned a particular character, number, or object with a designated target. Responsive to this determination, the authentication module 130C may allow access the computing device 100 for use by the user. Notably, the particular element need not be a previously selected designated element. Instead, the designated element may be determined by the user from a review of the secondary display portion 127.

Figure 3:
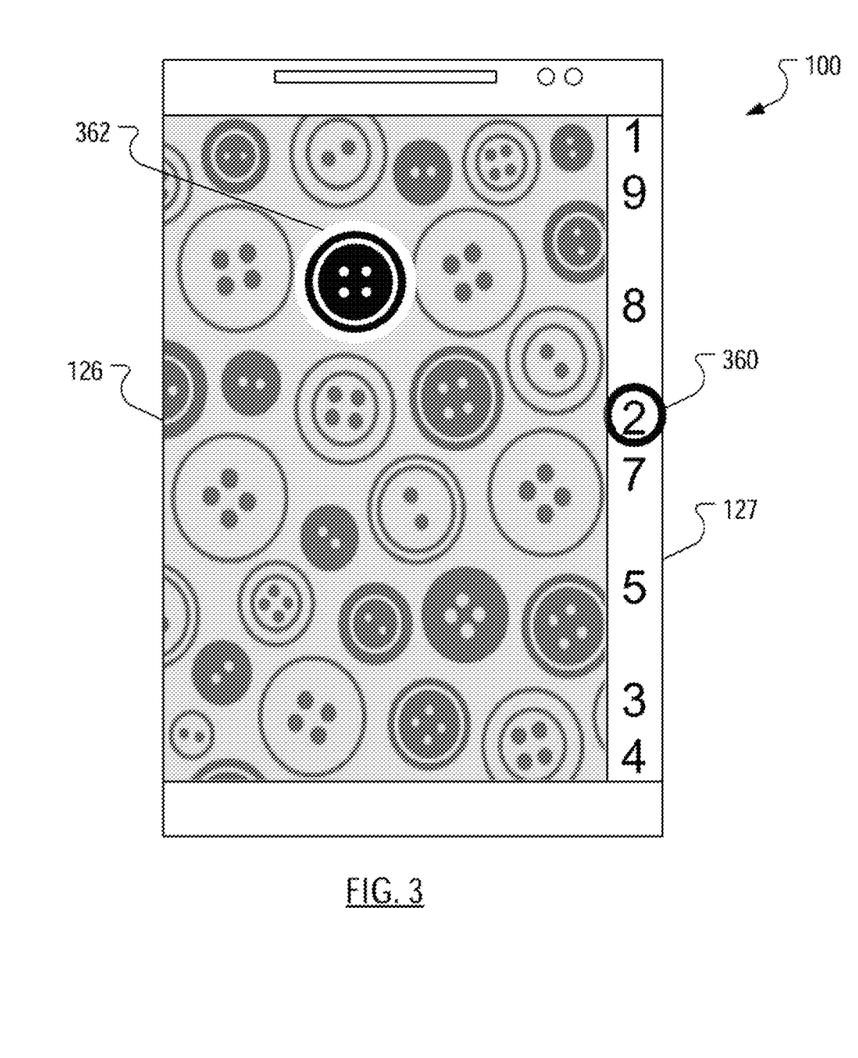
FIG. 3 illustrates a display for the device of FIG. 1 at a moment late in a setup procedure of a device authentication scheme in accordance with an aspect of the present application.

FIG. 3 illustrates the primary display portion 126 and the secondary display portion 127 of the computing device 100 during an example setup procedure. The user has selected the location of the fourth number, reading down from the top, on the secondary display portion 127 as a "designated element location" 360. Notably, spacing between elements in the secondary display portion 127 helps the user understand which location has been selected. The user has also set an area represented by a button in the second row from the top and second column from the left as a "designated target" 362 within an image, e.g., a representation of a plurality of buttons.

Notably, the size of the designated target 362 be configurable. A designated target 362 configured to be relatively small may be considered to increase security. A designated target 362 configured to be relatively large may be considered to decrease security. In some embodiments, a user may be provided a capability for configuring the size and/or shape of the designated target 362, and/or threshold proximity between element and the designated target 362.

In the future, to gain access to the computing device 100, the user manipulates a grid of elements until an instance of whatever element is found in the designated element location 360 is proximal to the designated target 362. In some embodiments, a user may be provided a capability for configuring threshold proximity between the instance of whatever element is found in the designated element location 360 and the designated target 362.

Figure 4:
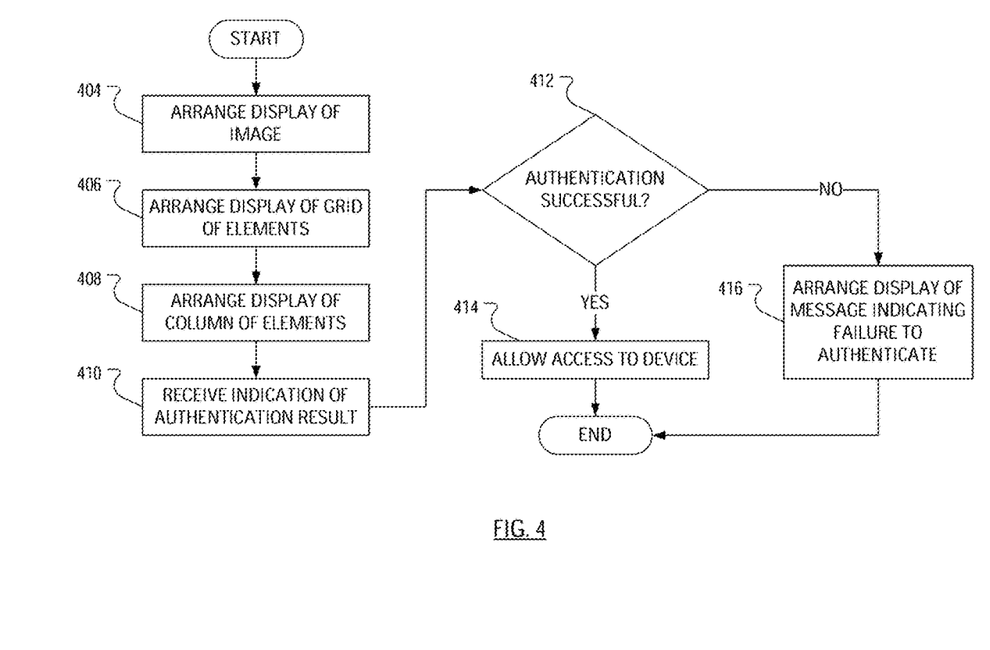
FIG. 4 illustrates example steps in a method of preparing the mobile communication device of FIG. 1 allowing access in accordance with an aspect of the present application.

FIG. 4 illustrates example steps in a method of preparing the computing device 100 for allowing access. Initially, the microprocessor 128 may arrange (step 404) display, on the primary display portion 126, of the image of a plurality of buttons that was used in the setup procedure, a moment of which is illustrated in FIG. 3. The microprocessor 128 may also arrange (step 406) display, on the primary display portion 126, of a first plurality of elements overlaying the image. In one example, the first plurality of elements are arranged in a grid pattern (see FIG. 5). The microprocessor 128 may also arrange (step 408) display, on the secondary display portion 127, of a second plurality of elements. In one example, in keeping with the geometry of the secondary display portion 127 illustrated in FIG. 2, the second plurality of elements is arranged in a column.

Figure 5:
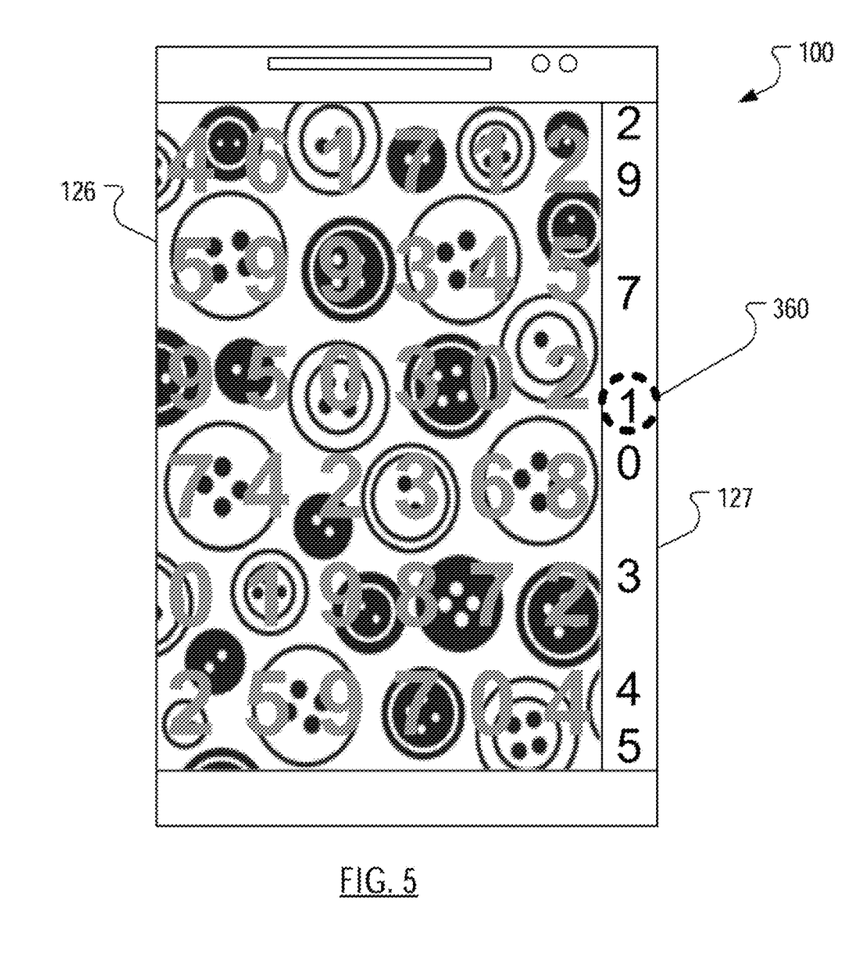
FIG. 5 illustrates the mobile communication device of FIG. 1 in a moment early in an authentication procedure in accordance with an aspect of the present application.

FIG. 5 illustrates the computing device 100 during an example authentication procedure. In FIG. 5, the image of a plurality of buttons that was used in the setup procedure, a moment of which is illustrated in FIG. 3, has been overlaid with a grid of elements.

To gain access to the computing device 100, the user touches the primary display portion 126 and drags the grid of elements. The user maintains contact with the primary display portion 126 while moving whatever is touching the primary display portion 126. Responsive to the movement of whatever is touching the primary display portion 126, the grid of elements moves while the image remains still. In this manner, the user may drag the grid of elements until an instance of the designated element, within the grid of elements, has been shifted within sufficient proximity to the designated target 362. That is, the user may drag the grid of elements until an instance of the number 1, within the grid of elements, has been shifted within sufficient proximity to the designated target 362. The number 1 is the designated element since the number 1 is found in the designated element location 360, fourth character down from the top of the secondary display portion 127. The user may then cease touching the primary display portion 126 thereby halting the movement of the grid of elements and leaving the number 1 within sufficient proximity to the designated target 362.

Figure 6:
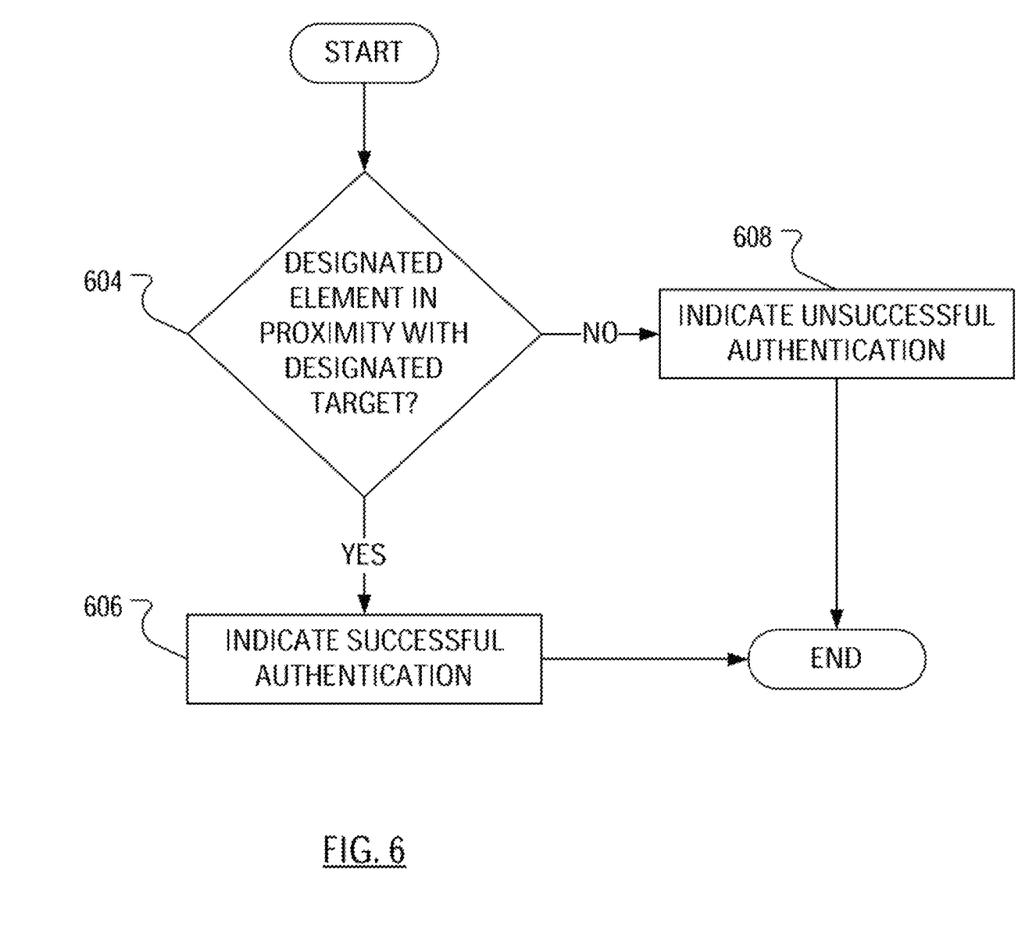
FIG. 6 illustrates example steps in a method of authenticating a user in accordance with an aspect of the present application.

FIG. 6 illustrates example steps in a method of authenticating a user. The authentication module 130C may determine (step 604) whether the user has successfully shifted the designated element within sufficient proximity to the designated target 362. That is, the authentication module 130C may determine (step 604) whether the user has successfully shifted the number 1 within sufficient proximity to the designated target 362. Responsive to determining (step 604) that the user has successfully shifted the number 1 within sufficient proximity to the designated target 362, the authentication module 130C may indicate (step 606), to the microprocessor 128, an authentication result. More specifically, the authentication module 130C may indicate (step 606), to the microprocessor 128, that the authentication was successful. Responsive to determining (step 604) that the user has not shifted the number 1 within sufficient proximity to the designated target 362, the authentication module 130C may indicate (step 608), to the microprocessor 128, an authentication result. More specifically, the authentication module 130C may indicate (step 608), to the microprocessor 128, that the authentication was unsuccessful.

Returning to the method of FIG. 4, upon receiving (step 410) an indication of the authentication result, the authentication module 130C may determine (step 412), from the received authentication result, whether the authentication was successful. Upon determining (step 412), from the received authentication result, that the authentication was successful, the authentication module 130C may allow access (step 414) to the computing device 100.

Upon determining (step 412), from the received authentication result, that the authentication was unsuccessful, the authentication module 130C may arrange (step 416) display of a message indicating a failure to authenticate. The message may, for example, be arranged to be displayed on the primary display portion 126.

With the help of the secondary display portion 127 then, the authentication may be considered to have been accomplished on the basis of a combination of a designated element found in the designated element location 360 and a designated target 362 within an image. By combining an element-from-a-location with a designated target, the user may be considered to have formed a "dynamic combination." It may be considered that authentication on the basis of a dynamic combination stands as an improvement over authentication on the basis of a static combination.

Although, for simplicity of presentation, the secondary display portion 127 is illustrated, in FIGS. 3 and 5, as being in the same viewing plane as the primary display portion 126, the secondary display portion 127 may be in a viewing plane distinct from the viewing plane of the primary display portion 126, as illustrated in FIG. 2. In general, use of a secondary display on a viewing plane distinct from the viewing plane of a primary display may be considered to limit a range of "shoulder surfing" viewing angles. It may be considered that a "shoulder surfing" viewing angle is a viewing angle that allows a shoulder surfer to view content on both the primary display portion 126 and the secondary display portion 127.

A device may comprise a plurality of displays. In addition to a secondary display, a device can have a tertiary display. Indeed, with the addition of a tertiary display, methods of authentication using a grid of elements and an image may be enhanced in a manner distinct from the manner disclosed hereinbefore.

In the authentication method in view of FIGS. 2-6, the target within the image, with which an instance of an element was to be shifted into proximity, remained static and the designated element to be shifted was dynamic. In the following embodiment, the designated target is dynamic and the designated element to be shifted is static.

Figure 7:
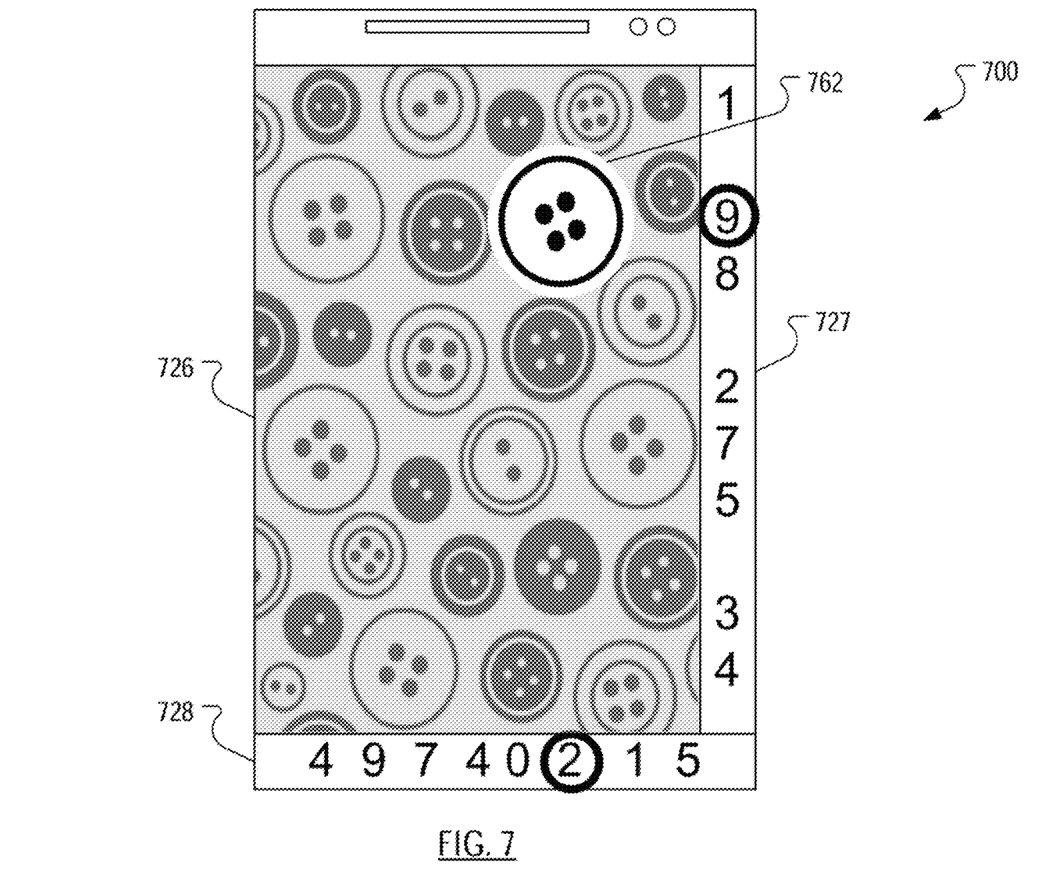
FIG. 7 illustrates a mobile communication device with a primary display, a secondary display and a tertiary display at a moment late in a setup procedure of a device authentication scheme in accordance with an aspect of the present application.

FIG. 7 illustrates a computing device 700 with a primary display portion 726, a secondary display portion 727 and a tertiary display portion 728. More particularly, FIG. 7 illustrates the primary display portion 726, the secondary display portion 727 and the tertiary display portion 728 of the computing device 700 during an example setup procedure. The user has selected a location 762, within the image, containing a button. The position of the location 762 is aligned with the second element, reading down from the top, on the secondary display 727. By selecting the button, the user has selected the number "9" as a "first designated location element." The position of the location 762 is also aligned with the sixth element, reading left to right, on the tertiary display 728. By selecting the button, the user has selected the number "2" as a "second designated location element." Furthermore, though not shown, the user has selected the number "1" as a "designated element."

Figure 8:
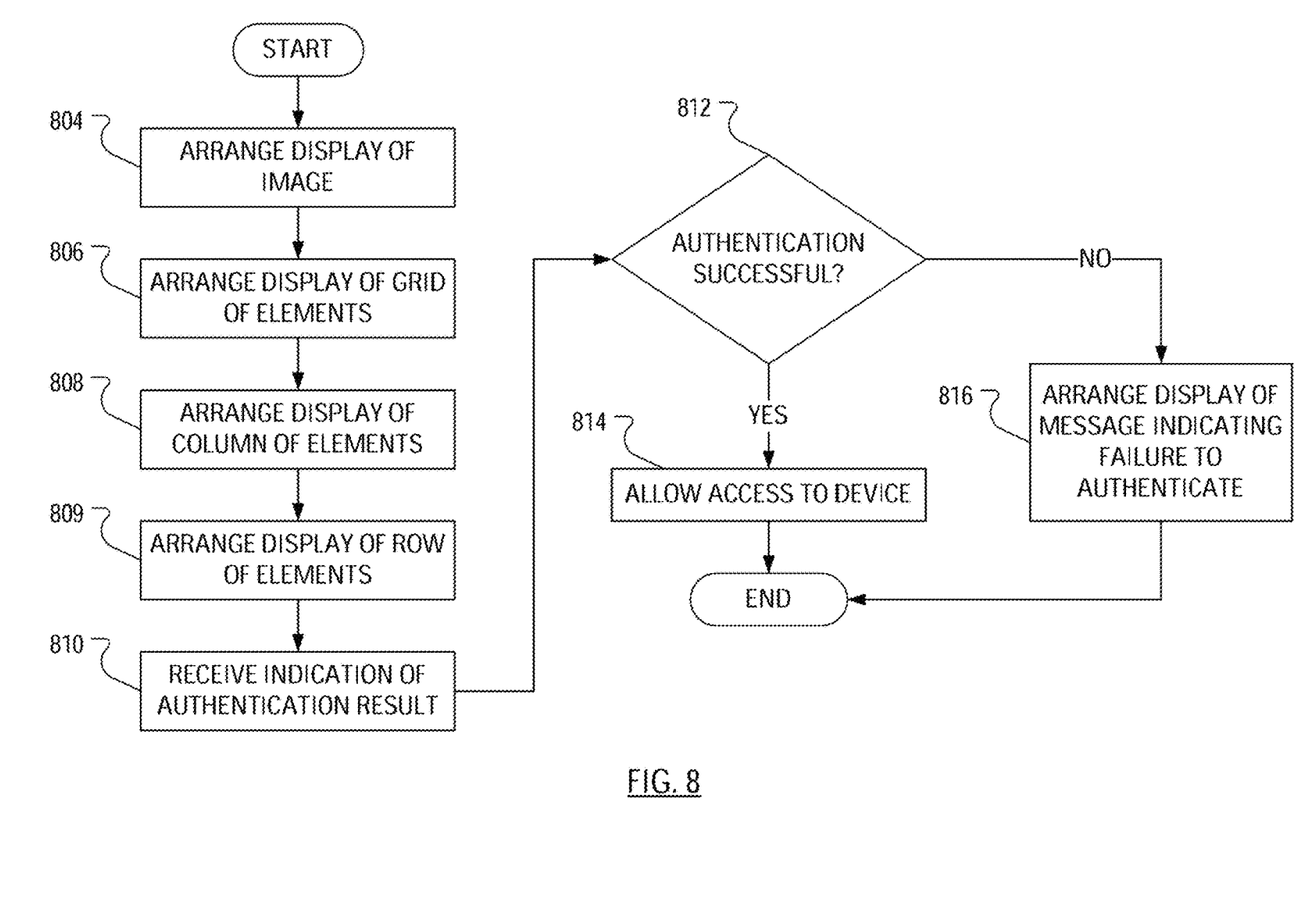
FIG. 8 illustrates example steps in a method of preparing the mobile communication device of FIG. 7 for allowing access in accordance with an aspect of the present application.

FIG. 8 illustrates example steps in a method of preparing the computing device 700 for allowing access. Initially, the microprocessor may arrange (step 804) display, on the primary display portion 726, of an image. The microprocessor may also arrange (step 806) display, on the primary display portion 726, of a first plurality of elements overlaying the image. In one example, the first plurality of elements are arranged in a grid pattern (see FIG. 9). The microprocessor may further arrange (step 808) display, on the secondary display portion 727, a second plurality of elements. In one example, in keeping with the geometry of the secondary display portion 727 illustrated in FIG. 7, the second plurality of elements is arranged in a column. The microprocessor may still further arrange (step 809) display, on the tertiary display portion 728, a third plurality of elements. In one example, in keeping with the geometry of the tertiary display portion 728 illustrated in FIG. 7, the third plurality of elements is arranged in a row.

Figure 9:
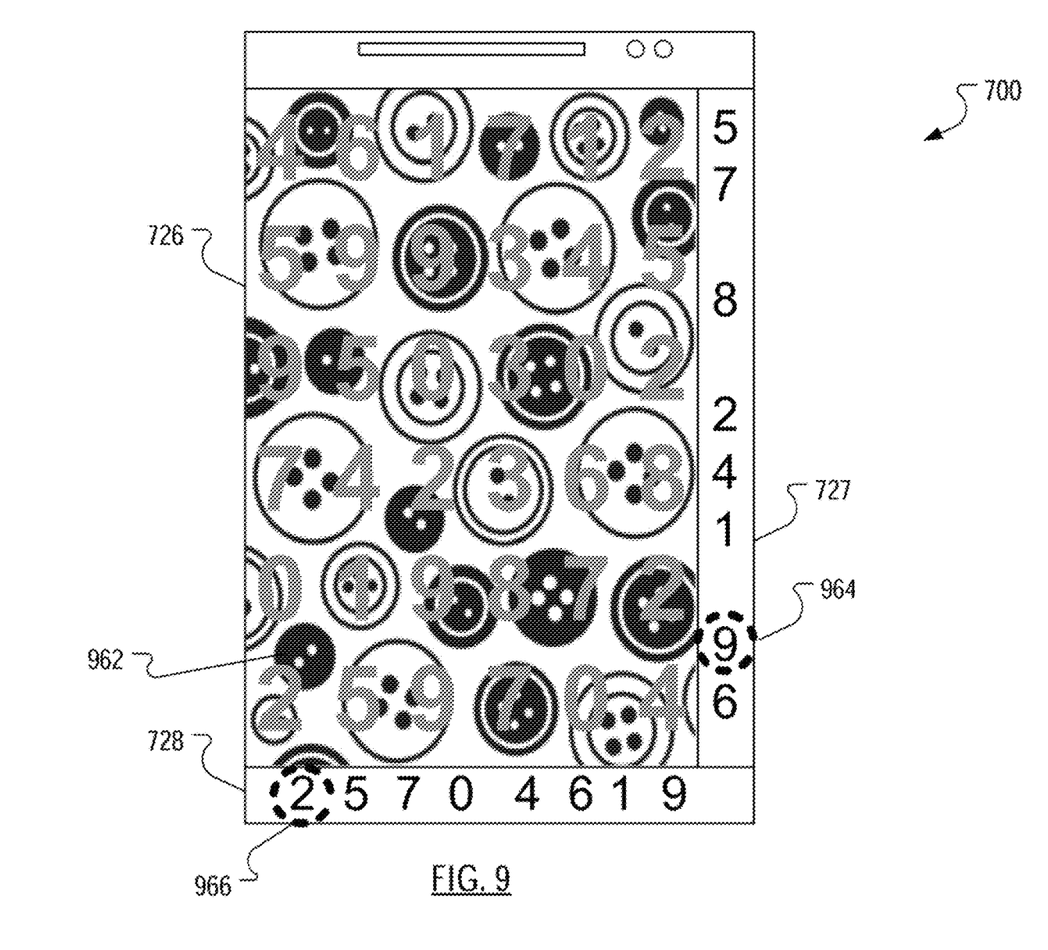
FIG. 9 illustrates the mobile communication device of FIG. 7 in a moment early in an authentication procedure in accordance with an aspect of the present application.

FIG. 9 illustrates the computing device 700 during an authentication procedure. In FIG. 9, the image that was used in the setup procedure, a moment of which is illustrated in FIG. 7, has been overlaid with a grid of elements.

To gain access to the computing device 700, the user touches the primary display 726 and drags the grid of elements. The user maintains contact with the primary display 726 while moving whatever is touching the primary display 726. Responsive to the movement of whatever is touching the primary display 726, the grid of elements shifts while the image remains still. In this manner, the user may shift the grid of elements until an instance of the number 1, within the grid of elements, is shifted into sufficient proximity with the designated target. The user may then cease touching the primary display 726 thereby halting the movement of the grid of elements and leaving the number 1 in proximity with the designated target.

The number 1 is used responsive to the user having selected the number "1" as the designated element. A button 962 in the bottom-left region of the image may be considered to be the designated target. Determination of the designated target may be responsive to the button 962 being horizontally aligned with a first designated location element region 964 in the secondary display 727 and being vertically aligned with a second designated location element region 966 in the tertiary display 728. Determination of the first designated location element region 964 may be responsive to locating the number 9 (the "first designated location element") in the secondary display 727. Determination of the second designated location element region 969 may be responsive to locating the number 2 (the "second designated location element") in the tertiary display 728.

An authentication module of the computing device 700 may determine (step 604) whether the user has successfully shifted the designated element into sufficient proximity with the designated target 962. That is, the authentication module may determine (step 604) whether the user has successfully shifted an instance of the number 1 into sufficient proximity with the button 962. Responsive to determining (step 604) that the user has successfully shifted an instance of the number 1 into sufficient proximity with the button 962, the authentication module may indicate (step 606), to the microprocessor, an authentication result. More specifically, the authentication module may indicate (step 606), to the microprocessor, that the authentication was successful. Responsive to determining (step 604) that the user has not shifted the number 1 into sufficient proximity with the button 962, the authentication module may indicate (step 608), to the microprocessor, an authentication result. More specifically, the authentication module may indicate (step 608), to the microprocessor, that the authentication was unsuccessful.

Returning to the method of FIG. 8, upon receiving (step 810) an indication of the authentication result, the authentication module may determine (step 812), from the received authentication result, whether the authentication was successful. Upon determining (step 812), from the received authentication result, that the authentication was successful, the authentication module may allow access (step 814) to the computing device 700.

Upon determining (step 812), from the received authentication result, that the authentication was unsuccessful, the authentication module may arrange (step 816) display of a message indicating a failure to authenticate. The message may, for example, be arranged to be displayed on the primary display portion 726.

While the above examples use numbers for the elements, the numbers in the first plurality of elements (the grid), in the second plurality of elements (the column) and the third plurality of elements (the row) may, more generically, be referred to as elements. The elements may comprise alphabetic characters, or numeric characters, or special characters, or symbols, or any combination thereof. In some embodiments, an element may comprise plural characters or words. Furthermore, the characters need not be taken from the Latin alphabet. Indeed, Greek letters are equally useful along with characters from languages such as Arabic, Mandarin, Cantonese, Korean, Japanese, etc. In some embodiments, the elements may comprise graphical objects, such as shapes, lines, icons or other elements.

In addition, various examples herein refer to use of an image. In various embodiments, the image may comprise a computer-generated image, a picture, a wallpaper, a background, a map, a graphic, a 1-D image, an animation or another visual representation.

Furthermore, while various embodiments herein have been described in connection with allowing access to a device, in other embodiments, the methods may be used to authenticate and gain access to a portion of the device, or specific functionality, or a particular application or applications, or a particular account or accounts. In one example, the device may comprise a plurality of workspaces such as a personal workspace and an enterprise workspace, and the authentication methods may be used to unlock one of the workspaces, such as the personal workspace, without unlocking the enterprise workspace. In another example, one particular combination of a character and target area may unlock a personal workspace, while a different combination of character and target area may unlock an enterprise workspace. In another example, the device may comprise a plurality of user accounts, and one particular combination of a character and target area may unlock a first user account, while a different combination of character and target area may unlock a second user account.

Furthermore, while various examples herein refer to a device comprising a computing device, the authentication methods described herein can be used for a wide variety of electronic devices. For example, the methods can be used for authentication for access to a computer, tablet, laptop, phablet, smartphone, cellular phone, PDA (personal digital assistant), printer, camera, gaming device, accessory, media player, e-reader, ATM (automated teller machine), bank machine, etc. In other examples, the methods can be used for authentication for access to an account, such as an email account, credit card account, bank account, etc. or any other account in which a user typically logs in to gain access. In other examples, the methods can be used for authentication for a transaction, such as a credit card transaction, bank card transaction, or debit card transaction, etc. In other examples, the methods can be used for gaining physical access including access to premises such as buildings, homes, residences, vehicles, schools, rooms, etc. In sum, the methods for authentication described herein can be used in a wide variety of settings.

The above-described implementations of the present application are intended to be examples only. Alterations, modifications and variations may be effected to the particular implementations by those skilled in the art without departing from the scope of the application, which is defined by the claims appended hereto.

What is claimed is:

1. A method of authenticating access to an electronic device, the method comprising:
    as part of a setup procedure,
        detecting configuration including:
        selection of a designated target in an image; and
        selection of a designated element location on a secondary display portion;
    as part of an authentication procedure,
        arranging display of the image on a primary display portion, the image including the designated target;
        arranging display of a first plurality of elements on the primary display portion overlaying the image, the first plurality of elements including a first instance of a designated element;
        arranging display of a second plurality of elements on the secondary display portion, wherein the second plurality of elements includes a second instance of the designated element in the designated element location, thereby providing an indication that the first instance of the designated element is relevant to authentication;
        detecting interaction with the first plurality of elements causing shifting of the first plurality of elements relative to the image that sufficient proximity is achieved between the first instance of the designated element and the designated target;
        responsive to the detecting the interaction that sufficient proximity is achieved, authenticating access to the electronic device; and
        responsive to the authenticating, allowing access to the electronic device.

2. The method of claim 1 wherein the secondary display portion comprises a curved display.

3. The method of claim 1 wherein the first plurality of elements are displayed in a grid pattern.

4. The method of claim 1 wherein the first plurality of elements comprise characters.

5. The method of claim 1 wherein the first plurality of elements comprise objects.

6. An electronic device comprising:
    a primary hardware display portion:
    a secondary hardware display portion;
    a memory storing instructions; and
    a hardware processor configured, by the instructions, to:
        as part of a setup procedure,
            detect configuration including:
                selection of a designated target in an image; and
                selection of a designated element location on the secondary hardware display portion; and
            arrange display of the image on the primary display portion, the image including the designated target;
        as part of an authentication procedure,
            arrange display of a first plurality of elements on the primary display portion overlaying the image, the first plurality of elements including a first instance of a designated element;
            arrange display of a second plurality of elements on the secondary display portion, wherein the second plurality of elements includes a second instance of the designated element in the designated element location, thereby providing an indication that the first instance of the designated element is relevant to authentication;
            detect interaction with the first plurality of elements causing shifting of the first plurality of elements relative to the image that sufficient proximity is achieved between the first instance of the designated element and the designated target;
            authenticate, responsive to the detecting the interaction that sufficient proximity is achieved, access to the electronic device; and
            responsive to the authenticating, allow access to the electronic device.

7. The electronic device of claim 6 wherein the secondary display portion comprises a curved display.

8. The electronic device of claim 6 wherein the processor is further configured to arrange the first plurality of elements in a grid pattern.

9. The electronic device of claim 6 wherein the first plurality of elements comprise numeric characters.

10. The electronic device of claim 6 wherein the first plurality of elements comprise alphabetic characters.

11. A non-transitory computer readable storage medium having stored thereon computer executable instructions, the computer executable instructions comprising code that, upon execution by a processor in an electronic device, causes the processor to:

as part of a setup procedure,
  detect configuration including:
    selection of a designated target in an image; and
    selection of a designated element location on a secondary display portion;
as part of an authentication procedure,
  arrange display of the image on a primary display portion, the image including the designated target;
  arrange display of a first plurality of elements on the primary display portion overlaying the image, the first plurality of elements including a first instance of a designated element;
  arrange display of a second plurality of elements on the secondary display portion, the second plurality of elements including a second instance of the designated element in the designated element location, thereby providing an indication that the first instance of the designated element is relevant to authentication;
  detect interaction with the first plurality of elements causing shifting of the first plurality of elements relative to the image that sufficient proximity is achieved between the first instance of the designated element and the designated target;
  authenticate, responsive to the detecting the interaction that sufficient proximity is achieved, access to the electronic device; and
  responsive to the authenticating, allow access to the electronic device.

12. The computer readable medium of claim 11 wherein the secondary display comprises a curved display.

13. The computer readable medium of claim 11 wherein execution of the code causes the processor to arrange the first plurality of elements in a grid pattern.

14. The computer readable medium of claim 11 wherein the first plurality of elements comprise numeric characters.

15. The computer readable medium of claim 11 wherein the first plurality of elements comprise alphabetic characters.

* * * * *